(12) United States Patent
Cho et al.

(10) Patent No.: US 8,130,393 B2
(45) Date of Patent: Mar. 6, 2012

(54) PRINTING APPARATUS, CONTROL METHOD THEREFOR, AND DATA PROCESSING APPARATUS USING THE PRINTING APPARATUS

(75) Inventors: Young Kyoo Cho, Kyungki-do (KR); Kyoung Hwan Na, Kyungki-do (KR); Hae Yong Choi, Kyungki-do (KR)

(73) Assignee: Bixolon Co. Ltd. (KR)

( * ) Notice: Subject to any disclaimer, the term of this patent is extended or adjusted under 35 U.S.C. 154(b) by 1083 days.

(21) Appl. No.: 11/408,733

(22) Filed: Apr. 17, 2006

(65) Prior Publication Data

US 2006/0268326 A1  Nov. 30, 2006

(30) Foreign Application Priority Data

Apr. 18, 2005  (KR) .................. 10-2005-0032117

(51) Int. Cl.
  *G06F 3/12* (2006.01)
  *G06K 15/00* (2006.01)
(52) U.S. Cl. ............. 358/1.15; 358/1.14; 358/1.16; 700/213; 700/9; 355/89; 400/70
(58) Field of Classification Search .............. None
  See application file for complete search history.

(56) References Cited

U.S. PATENT DOCUMENTS

| | | | |
|---|---|---|---|
| 4,989,163 A * | 1/1991 | Kawamata et al. | 358/1.6 |
| 5,594,653 A | 1/1997 | Akiyama et al. | |
| 6,198,985 B1 * | 3/2001 | Miyasaka et al. | 700/213 |
| 6,341,907 B1 * | 1/2002 | Katsuyoshi | 400/582 |
| 6,452,693 B1 | 9/2002 | Isoda et al. | |
| 6,768,557 B1 | 7/2004 | Minowa et al. | |
| 6,788,428 B1 | 9/2004 | Shimokawa | |
| 7,271,924 B1 * | 9/2007 | Takamizawa et al. | 358/1.14 |
| 2003/0161002 A1 * | 8/2003 | Nishiwaki et al. | 358/1.15 |

FOREIGN PATENT DOCUMENTS

| | | |
|---|---|---|
| EP | 0652533 A2 | 5/1995 |
| EP | 0902371 A1 | 3/1999 |
| EP | 1026599 A2 | 8/2000 |
| JP | 9-006555 A | 1/1997 |
| JP | 2000-298564 A | 10/2000 |
| JP | 2004-005758 A | 1/2004 |

* cited by examiner

*Primary Examiner* — James A Thompson
*Assistant Examiner* — Huo Long Chen
(74) *Attorney, Agent, or Firm* — The Webb Law Firm

(57) ABSTRACT

A printing apparatus in which a general command is converted to a real-time command depending on the needs, allowing fast status analysis and error recovery with fewer number of control commands without inconveniencing the user, a control method therefor, and a data processing apparatus using the printing apparatus. In the printing apparatus or the data processing apparatus including the same which is operated by transmission of command data and print data from a host computer, general data usually processed in order is converted to a real-time command using a real-time command identifier. The printing apparatus receives the data with the real-time command identifier and processes the command or print data designated by the real-time command identifier. The apparatus and method allow using a fewer number of commands to execute various controls.

14 Claims, 6 Drawing Sheets

(a)

(b)

PRINTING APPARATUS, CONTROL METHOD THEREFOR, AND DATA PROCESSING APPARATUS USING THE PRINTING APPARATUS

CLAIM OF PRIORITY

This application claims the benefit of Korean Patent Application No. 2005-32117 filed on Apr. 18, 2005, in the Korean Intellectual Property Office, the disclosure of which is incorporated herein by reference.

BACKGROUND OF THE INVENTION

1. Field of the Invention

The present invention relates to a printing apparatus connected to a host computer to execute printing according to a command from the host computer, and a printing apparatus used in a data processing apparatus such as a Point-of-Sale (POS) terminal and an electronic cash register (ECR) used for monetary transactions. More particularly, the invention relates to a printing apparatus capable of converting a general command to a real-time command, easily expanding the real-time command, and a control method therefor and a data processing apparatus using the printing apparatus.

2. Description of the Related Art

In general, printing apparatus such as those connected to a personal computer to print documents or pictures, and those provided in a data processing apparatus such as a POS terminal and ECR used in monetary transactions in a store to print receipts, execute operations including printing according to print data and command data transmitted from a host computer (including a personal computer).

FIG. 1 illustrates a basic configuration of a printing apparatus which includes an interface 1 for receiving print or command data from a host computer or transmitting data to the host computer; a memory 2 for storing various types of data; a printer driver 4 for driving the mechanics of the printing apparatus such as a printer head 6, a motor 7, and a flange part 8; a sensor 5 for sensing the state of the printing apparatus; and a Central Processing Unit (CPU) 3 for checking the state of the printing apparatus from an output signal of the sensor 5 and controlling the operation of the printer driver 4 according to data or command transmitted from the host computer.

In the meantime, while using a printing apparatus, there may be errors like the printing apparatus being out of paper or the cover is opened and so forth. When such an error occurs, a conventional printing apparatus stops its operation and brings the interface 1 connected to the host computer into an off-line state, and thus the host computer cannot continue to transmit data. At this point, because internal control of the printing apparatus stops, the data already received is not processed and there is no response from the printing apparatus to the command of the host computer.

In this case, the host computer displays that an error has occurred and interrupts its operation, maintaining this state until the user manually corrects the problem and brings the printing apparatus to an on-line state.

Therefore, there have been many inconveniences in recovering from the printing errors in the past, and no other work could be processed until the error was corrected. In particular, in the case of an ECR or a POS terminal, the printing operation is connected to the entire operation of the ECR or the POS terminal, causing inconveniences for the customers as well.

In addition, the conventional printing apparatus processes a control command by First-In-First-Out (FIFO) method, which creates a considerable time lag between output of the command from the host computer and actual execution of the command by the printing apparatus.

To overcome such a problem, U.S. Pat. No. 5,594,653 proposes a printing apparatus which distinguishes between a command to be processed at real time (hereinafter referred to as "real-time command") and a command to be processed in the order of so that the real-time commands can be processed first. FIG. 2 is a functional block diagram illustrating the printing apparatus disclosed in the above U.S. Pat. No. 5,594,653.

With reference to FIG. 2, in this prior art printing apparatus, when the host computer 10 transmits command data, print data and other information to the printing apparatus, this data and information is received by a data receiving means 11 and transmitted to a real-time command interpreting means 13. The real-time command interpreting means 13 interprets the command such that if it is a real-time command, transmits the command to a real-time execution means 22 to execute the command, and if it is not a real-time command, passes the command to be stored in a receive buffer 14.

In addition, a command interpreter 15 reads and interprets the commands stored in the receive buffer 14 in the order stored to distinguish between the command data for controlling the printing apparatus and the print data. The print data is stored in a print buffer 16 and the command data is transmitted to a control means 17. The control means 17 controls each functional block according to the command data transmitted from the command interpreter 15. For example, if the command transmitted from the command interpreter 15 is a print command, the control means 17 reads the data stored in the print buffer 16, controlling the print driver 19 to print a corresponding print pattern.

Real-time commands transmitted from the real-time interpreting means 13 to the real-time processing means 22 are designated at the time of designing, and may include, for example, a status request command, etc. Information on the errors, the paper, the cover, the switch and other status information sensed by a plurality of detectors 20 which detect the state of peripheral devices is stored in a status memory 23. Therefore, when a status request command is received, the real-time processing means 22 retrieves the status information from the status memory 23 and transmits it to the host computer 10 through a data transmission means 12.

Even if an error occurs, this printing apparatus continues to operate the data receiving means 11, the data transmission means 12, the real-time command interpreter 13 and the real-time processor 22 to enable data transmission and reception. This allows the printing apparatus provided with the POS terminal or the ECR to detect the state of the cash drawer by detecting the state of the peripheral devices. And by using the real-time command requesting status information as described above, the printing apparatus allows the user or manager to be able to check immediately whether the cash drawer is opened or locked.

In addition, the above-described printing apparatus includes an error recovery command as a real-time command so that when an error occurs, error information is deleted and printing operation is resumed without deleting the data stored in the receive buffer 14 and the print buffer 16.

However, in this prior art printing apparatus, real-time commands and general commands are distinguished at the time of designing, and thus a general command cannot be changed to a real-time command while using the printing apparatus. Thus, all possible situations with the printing apparatus need to be predicted in advance to establish the corresponding real-time commands.

Moreover, in general, a printing apparatus conducts various functions including cutting paper, transferring paper, printing, controlling peripheral devices (e.g. cash drawer, display), and the like. These functions are basically processed by general commands, but some need to be processed by real-time commands depending on the needs. For example, when an error occurs with the printing apparatus provided with the ECR, the cash drawer needs to be opened and closed at real time so as to prevent too much wait for the customer. But at usual times, the cash drawer needs to be opened and closed in the order of FIFO. Therefore, a command (e.g. control command of cash drawer) needs to be processed as a real-time command or a general command depending on the situation. However, it is difficult to predict these kinds of situations at the time of designing, and even if it is possible, the same command needs to be set as either a real-time command or a general command for different situations. This increases the number of commands and complicates the control structure of the printing apparatus, thereby causing inconveniences for the customers in turn.

SUMMARY OF THE INVENTION

The present invention has been made to solve the foregoing problems of the prior art and it is therefore an object of the present invention to provide a printing apparatus in which a general command can be converted to a real-time command depending on the needs, enabling rapid status analysis and error recovery with fewer number of commands without inconveniences in use, and to a control method therefor and a data processing apparatus using the printing apparatus.

According to an aspect of the invention for realizing the object, there is provided a printing apparatus operated by transmission of command data and print data from the host computer including:

a data receiving means for receiving data outputted from the host computer;

a data transmission means for transmitting data to the host computer;

a real-time command switching means for checking whether or not data received by the data receiving means is a real-time command identifier which designates the order in which real-time commands are to be processed, and if the data is the real-time command identifier, outputting the received data designated by the identifier directly to a command interpreter, and if the data is not the real-time command identifier, outputting the data to a receive buffer;

the receive buffer for storing the received data transmitted from the real-time command switching means- and outputting the data in the order of First-In-First-Out (FIFO) to the command interpreter;

the command interpreter for interpreting the received data outputted from the real-time command switching means with first priority, and reading and interpreting the received data stored in the receive buffer in the order of FIFO with next priority, distinguishing between command data and print data;

a print buffer for storing the received data distinguished as print data by the command interpreter; and a control means for receiving the data distinguished as command data by the command interpreter to control the overall function of the printing apparatus according to the corresponding command and reading the data from the print buffer to be printed.

In addition, the printing apparatus further includes: a plurality of detectors for detecting status and error in the printing apparatus; and a status memory for storing status information of the printing apparatus detected by the plurality of detectors, and in case of receiving a status request command, the command interpreter reads status information of the status memory and transmits the status information to the data transmission means.

Moreover, the real-time command identifier includes a first identification value for indicating a beginning point of a real-time command and a data duration value of the real-time command. Alternatively, the real-time command identifier includes a first identification value for indicating a beginning point of a real-time command and a second identification value for indicating an end of the real-time command.

According to another aspect of the invention for realizing the object, there is provided a control method of a printing apparatus operated by transmission of command data and print data from the host computer, including steps of:

(i) receiving data from the host computer;

(ii) checking whether or not the received data is a real-time command identifier which designates data order in which a real-time command is conducted;

(iii) interpreting the real-time command identifier when the real-time command identifier is received, to extract the data order designated by the real-time command identifier;

(iv) storing the received data in a receive buffer when it is determined from the previous step that the received data is not the real-time command identifier;

(v) interpreting the data extracted in the step (i), and then interpreting the data stored in the receive buffer in the order of FIFO; and (vi) executing the operation of the printing apparatus according to the interpreting result in the step (v).

In the control method of a printing apparatus according to the invention, the step (iii) may include checking a beginning point and duration information of the data from the real-time command identifier; counting data received subsequently after the real-time command identifier; and recognizing the data received up to the point until the counting value coincides with the checked duration of the data as real-time command data and extracting the real-time command data.

Further, the step (iii) may include: checking whether or not the received data is an identifier indicating a beginning point of a real-time command; checking whether or not the received data is an identifier indicating an ending point of a real-time command; and recognizing the data received between the identifier indicating the beginning point of the real-time command and the identifier indicating the ending point of the real-time command as real-time command.

According to yet another aspect of the invention for realizing the object, there is provided a data processing apparatus including: a host computer for checking whether or not there is a need for real-time processing when print data or command data is produced, and if there is a need for real-time processing, generating a real-time command identifier to designate data to be processed at real time and transmitting the real-time command identifier with corresponding data to a printing apparatus; and the printing apparatus for checking whether or not the data is the real-time command identifier when data is received from the host computer, and if the data is the real-time command identifier, interpreting the real-time command identifier to extract the designated data and process at first priority, and if the data is not the real-time command identifier, processing the data in the order to FIFO at next priority.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following description will present a printing apparatus, a control method therefor, and a data processing apparatus using the printing apparatus with reference to the accompanying drawings.

Figure 3:
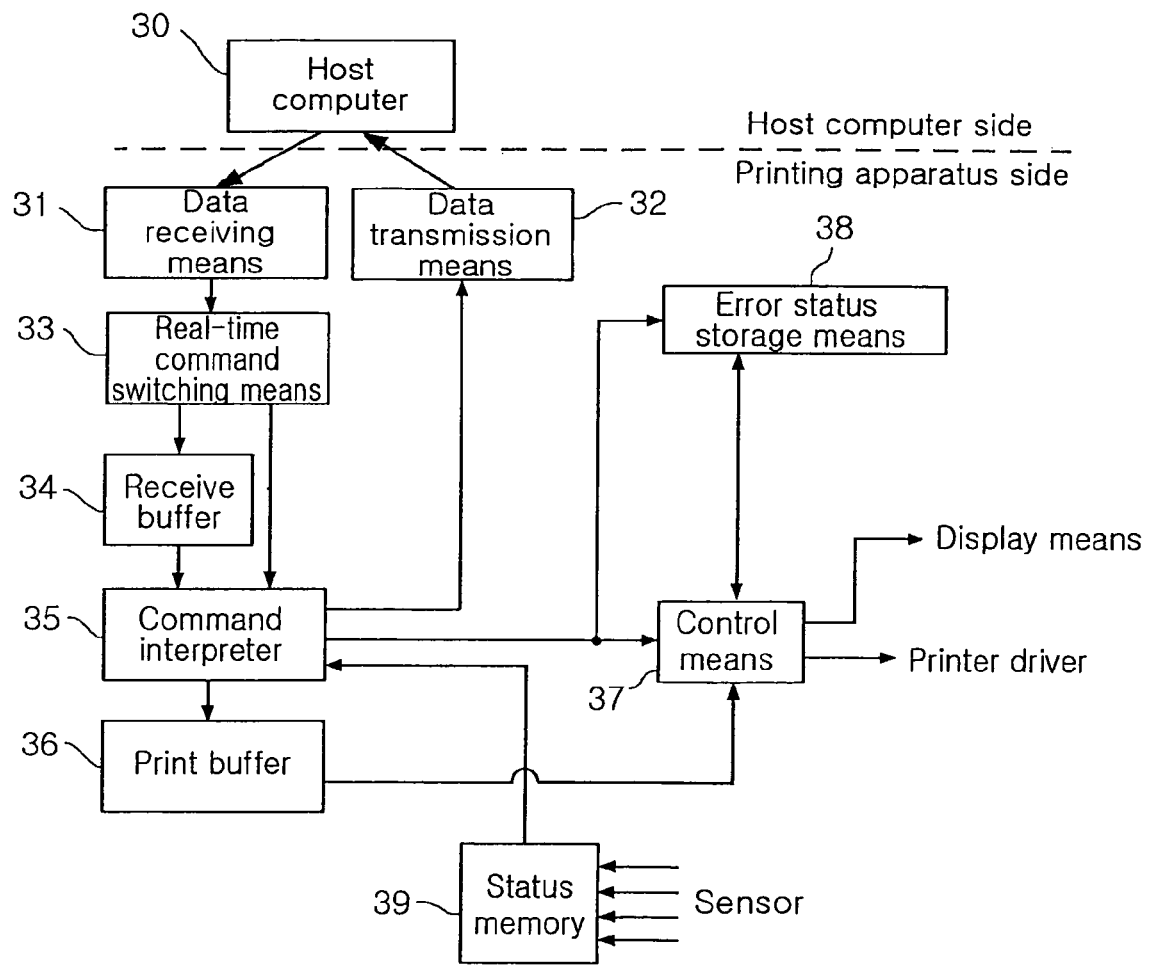
FIG. 3 is a functional block diagram illustrating a printing apparatus according to the present invention.

FIG. 3 is a functional block diagram illustrating a configuration of a printing apparatus and a data processing apparatus according to the present invention. FIG. 3 illustrates only the functional blocks related to the present invention. Other constituent parts are identical to those in a conventional printing apparatus.

As shown in FIG. 3, the data processing apparatus according to the present invention includes a host computer 30 which checks for a need for real-time processing when print data and command data is produced, and if there is such a need, generates a real-time command identifier to transmit with the produced data to a printing apparatus; and the printing apparatus which checks if the data is the real-time command identifier and if so, analyzes the real-time command identifier to process the designated data first, and if it is not the real-time identifier, processes the data in the order of First-In-First-Out (FIFO).

In addition, the printing apparatus provided in the data processing apparatus according to the present invention includes: a data receiving means 31 for receiving the data transmitted from the host computer 30; a data transmission means 32 for transmitting data to the host computer 30; and a real-time command switching means 33 which checks if the data received by the data receiving means 31 is a real-time command identifier, and if so, transmits the data designated by the identifier to a command interpreter 35, and if not, transmits the data to a receive buffer 34. The receive buffer 34 for storing the data that is not designated by the real-time command identifier and outputs the data in the order of FIFO. The printing apparatus further includes a command interpreter 35 which analyzes the data outputted from the real-time command switching means 33 with first priority and analyzes the data outputted from the receive buffer 34 with next priority, distinguishing between command data and print data, and if the analyzed command is a status request command, transmits status information from status memory 39 to the host computer 30 via the data transmission means 32; a print buffer 36 for storing the data determined as print data by the command interpreter 35; and a control means 37 for controlling the operation of the printing apparatus according to the command data transmitted from the command interpreter 35 or reading the data of the print buffer 36 to print. The status memory 39 stores the status information of the printing apparatus.

Figure 1:
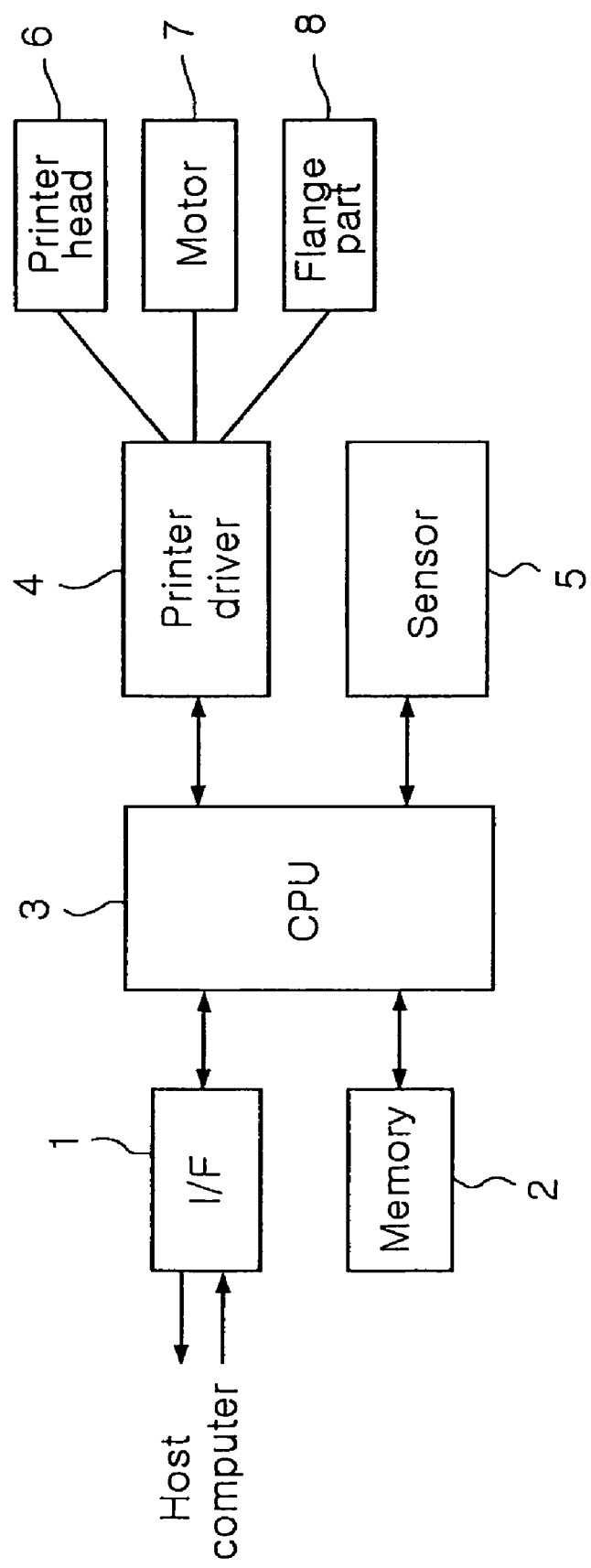
FIG. 1 is a block diagram illustrating a configuration of hardware in a general printing apparatus.
Figure 2:
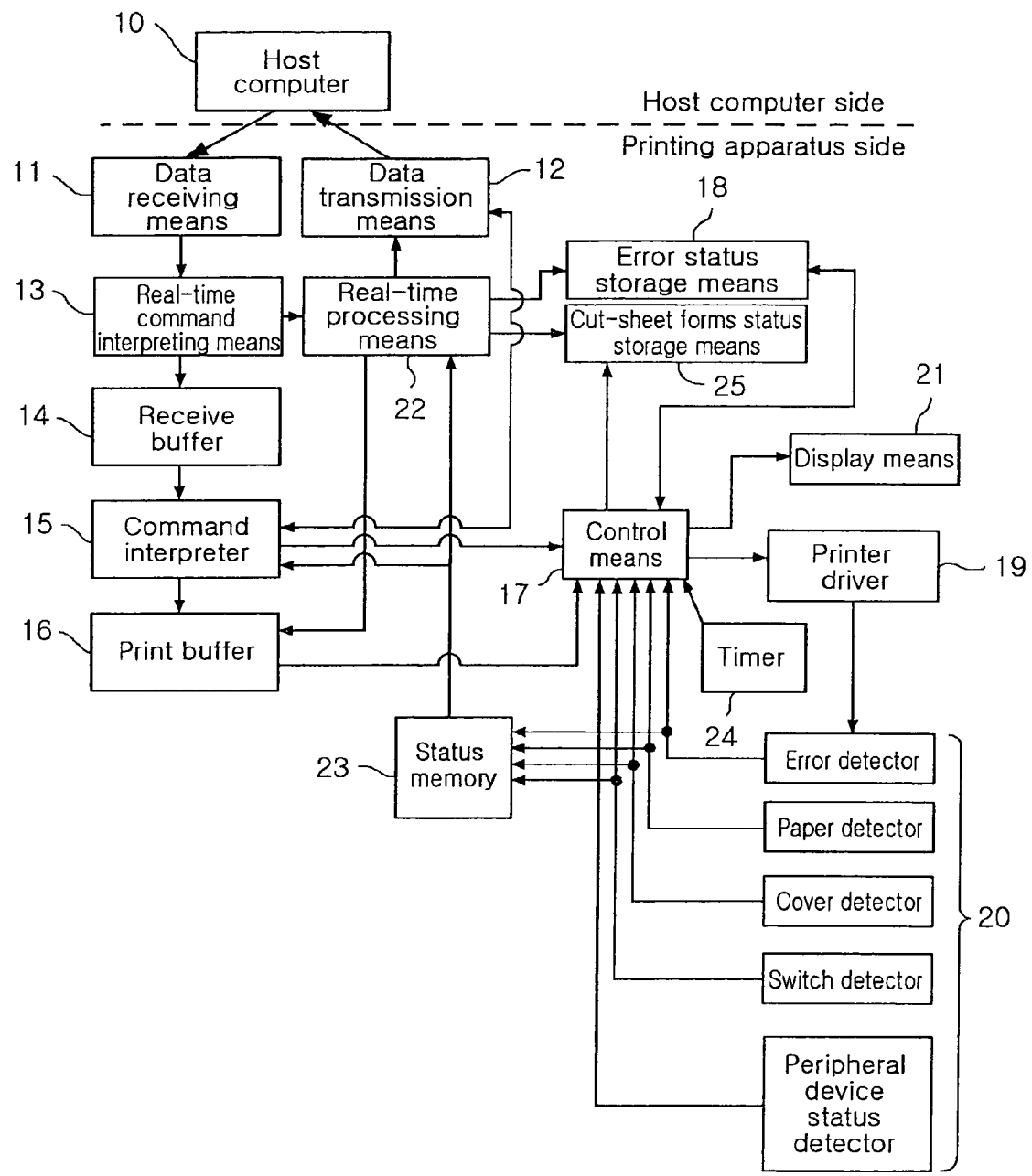
FIG. 2 is a functional block diagram illustrating an example of prior art printing apparatus.

Identical to the prior art printing apparatus shown in FIG. 2, the printing apparatus of the present invention may further include a plurality of sensors, a print mechanism function part (not shown), and an error status storage means 38 in addition to the above constitution. It may also include other constituent parts known in general in a printing apparatus having the functions identical to those in the conventional printing apparatus.

Command data as well as real-time data is designated in advance between the host apparatus 30 and the printing apparatus 30. The real-time command identifier is not a command directly executed in relation to the operation of the printing apparatus but only an identification value designating the data to be processed at real time. The identification value should be able to indicate a beginning and an end of the data to be processed at real time. That is, the host computer 30 expresses the real-time command identifier in such a designated way that a beginning and an end of the real-time command are indicated. When receiving the real-time command identifier, the printing apparatus interprets the real-time command identifier to distinguish between the data to be processed at real time and the data to be processed in the order of FIFO, and processes the data to be processed at real time with a priority over the data to be processed in the order of FIFO.

Figure 4:
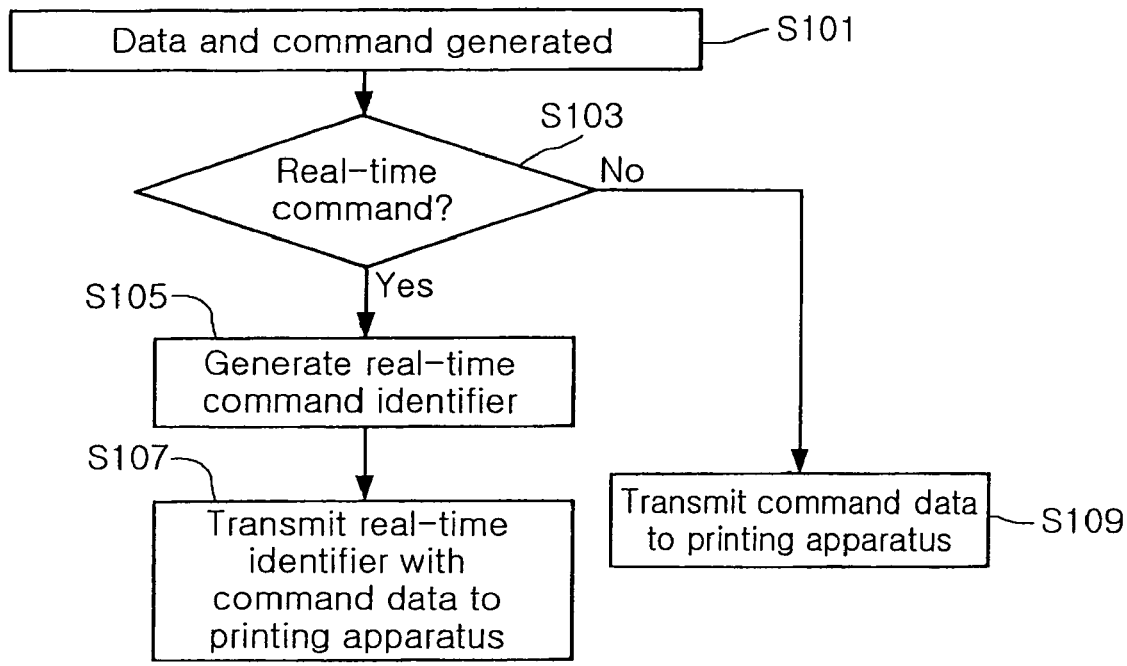
FIG. 4(a) is a flow chart illustrating a control process of a host computer according to the present invention.
FIG. 4(b) is a flow chart illustrating a control process of a printing apparatus according to the present invention.
Figure 4:
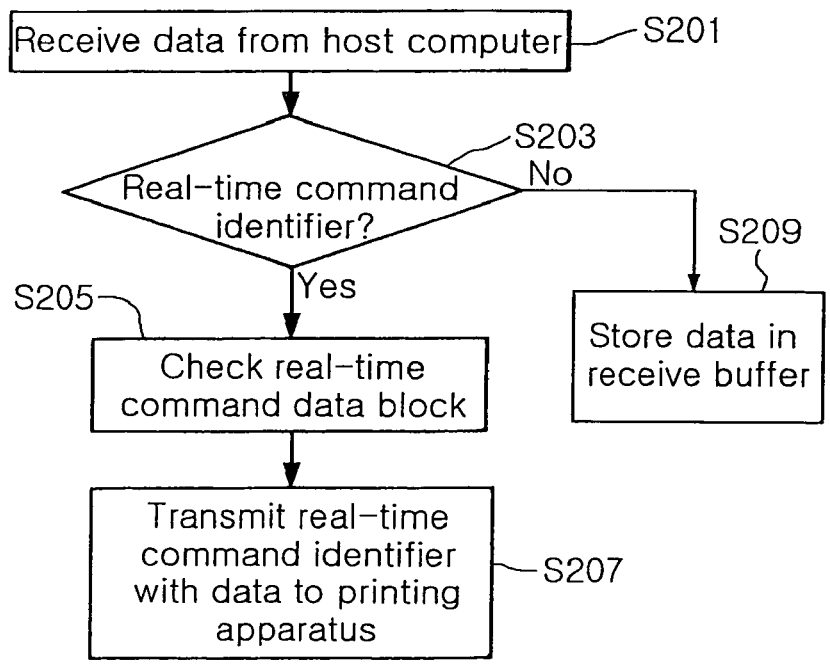

Now, an explanation is given on control processes of the printing apparatus and the data processing apparatus with reference to FIGS. 4(a) and 4(b).

FIG. 4(a) is a flow chart illustrating a control process of the host computer according to the present invention, and FIG. 4(b) is a flow chart illustrating a control process of the printing apparatus according to the present invention.

First, as shown in FIG. 4(a), when print data or command data to be transmitted to the printing apparatus is produced in S101, the host computer 30 determines whether a real-time command is needed for this received print or command data in S103. The step of determining in S103 entails, for example, designating a key (or a command language) for real-time command with the host computer 30 and checking whether the designated key (or the command language) for real-time command has been used or not.

When determined from the above process that processing by a real-time command is needed, a real-time command identifier of a predetermined form expressed to designate the corresponding data is generated in S105.

Then, this real-time command identifier is transmitted to the printing apparatus together with the corresponding print data or command data in S107. Conversely, if determined from the above process that there is no need for processing by a real-time command, the above produced data is transmitted to the printing apparatus without a real-time command identifier in S109.

In the above process, the real-time identifier should be able to designate a data block (i.e. a beginning point and an ending point of data) to be converted to a real-time command.

That is, the real-time command identifier may be composed of an identification value indicating a beginning point of a real-time command and a duration value of the data to be converted to the real-time command, and can be expressed, for example, as "[RS]R<n>" (where n is a natural number equal to or larger than 1). Here, [ ] indicates that the content inside thereof is a command language to command printing. In the above form, [RS]R indicates a beginning of conversion into the real-time command, and <n> indicates the duration of the data to be executed at real time, meaning that n byte of data received in the subsequent order is the real-time command.

Alternatively, the real-time command identifier can be composed of an identification value of a beginning point of a real-time command and an identification value of an ending point of the real-time command, and can be expressed, for example, as "[RS]R . . . <00>". Here, [RS]R means a beginning of conversion into the real-time command, and <00> means an end of conversion into the real-time command. Therefore, with respect to the order received, all data received between [RS]R and <00> is a real-time command.

As described above, the printing apparatus which receives data from the host computer 30 processes data as illustrated in FIG. 4(b).

That is, if data is received by the host computer 30 in S201, the data receiving means 31 sends all the received data to the real-time switching means 33 to check whether or not the data is a real-time command identifier. The real-time command switching means 33 determines whether the received data is a real-time command identifier in S203.

As a result, if the data is a real-time command identifier, the real-time command identifier is interpreted to check the data block required to be converted to the real-time command in S205, and then the checked data is transmitted to the command interpreter 35. Conversely, if the data is not a real-time command identifier, the received data is stored in the receive buffer 34 one by one.

As described above, when receiving the data from the real-time command switching means 33, the command interpreter 35 analyzes the data transmitted from the real-time command switching means 33 rather than reading the data stored in the receive buffer 34. From the analysis, if it is print data, the command interpreter 35 sends the data to the print buffer 36 as it gives a print command to the control means 37, and if it is a status request command, it reads status information of the printing apparatus from the status memory 39 and transmits the information to the host computer 30 through the data transmission means 32. If it is other command data, it sends the command data to the control means 37.

The print data or command data stored in the receive buffer 34 earlier than the data to be processed at real time is retrieved by the command interpreter 35 in the order of FIFO and processed after processing the data to be processed at real-time.

According to the above, the print data which could not be processed at real time in the prior art can be processed at real time depending on the needs of the user. Also, there is no need for designing that distinguishes a general command from a real-time command. Therefore, only basic commands can be set in advance, so that the basic commands that control the operation of the printing apparatus 30 per situation can be converted into real-time commands.

For example, in the case of a data processing apparatus such as a POS terminal or an ECR, the command for opening the cash drawer is processed after a printing command is processed, in general. However, if an error occurs in the midst of printing, there is a time delay until the error is corrected to print a receipt, inconveniencing the customer waiting to receive changes. In this situation, according to the present invention, the command for opening the cash drawer can be transmitted with a real-time command identifier, and the printing apparatus is operated to open the cash drawer without a wait for error correction or receipt printing. Therefore, the printing apparatus can be operated appropriately in response to any situation without causing a wait.

Another example of the commands processed in the order of FIFO includes a paper-cutting command. The paper-cutting command is usually executed after a print command is processed. However, in case of a paper jam while printing receipts, the problem needs to be corrected first, before the receipts are successfully printed. But in the present invention, when the paper-cutting command is sent to the printing apparatus with a real-time command identifier from the host computer 30, the printing apparatus performs the paper-cutting command before other commands. In this case, the paper jam can be recovered by cutting the paper, and the rest of the receipts can be printed without the user having to manually correct the problem.

In addition, the host computer 30 may request the printing apparatus to provide status information. In general, the status information request command is not urgent, and thus processed by FIFO method. Therefore, according to the prior art, when an error occurs in the printing apparatus, the error is corrected and the command received earlier is processed first before a status request command is processed. Thus, the host computer 30 could not immediately obtain the status information of the printing apparatus related to the error. According to the present invention, however, when an error occurs and the host computer 30 needs the print status information for correcting the error, the host computer 30 transmits the status information request command with a real-time command identifier. In response to this, the printing apparatus processes the status information request command first even if there is data received earlier, thus sending the status information related to the error to the host computer 30. Therefore, the host computer 30 is able to collect the status information of the printing apparatus with the error when an error occurs. This also can enable the host computer 30 to have control over automatic recovery from the error.

In addition, the print status information related to the error collected as described above can be provided to the user, thus accommodating the user even when he or she manually corrects the error.

Figure 5:
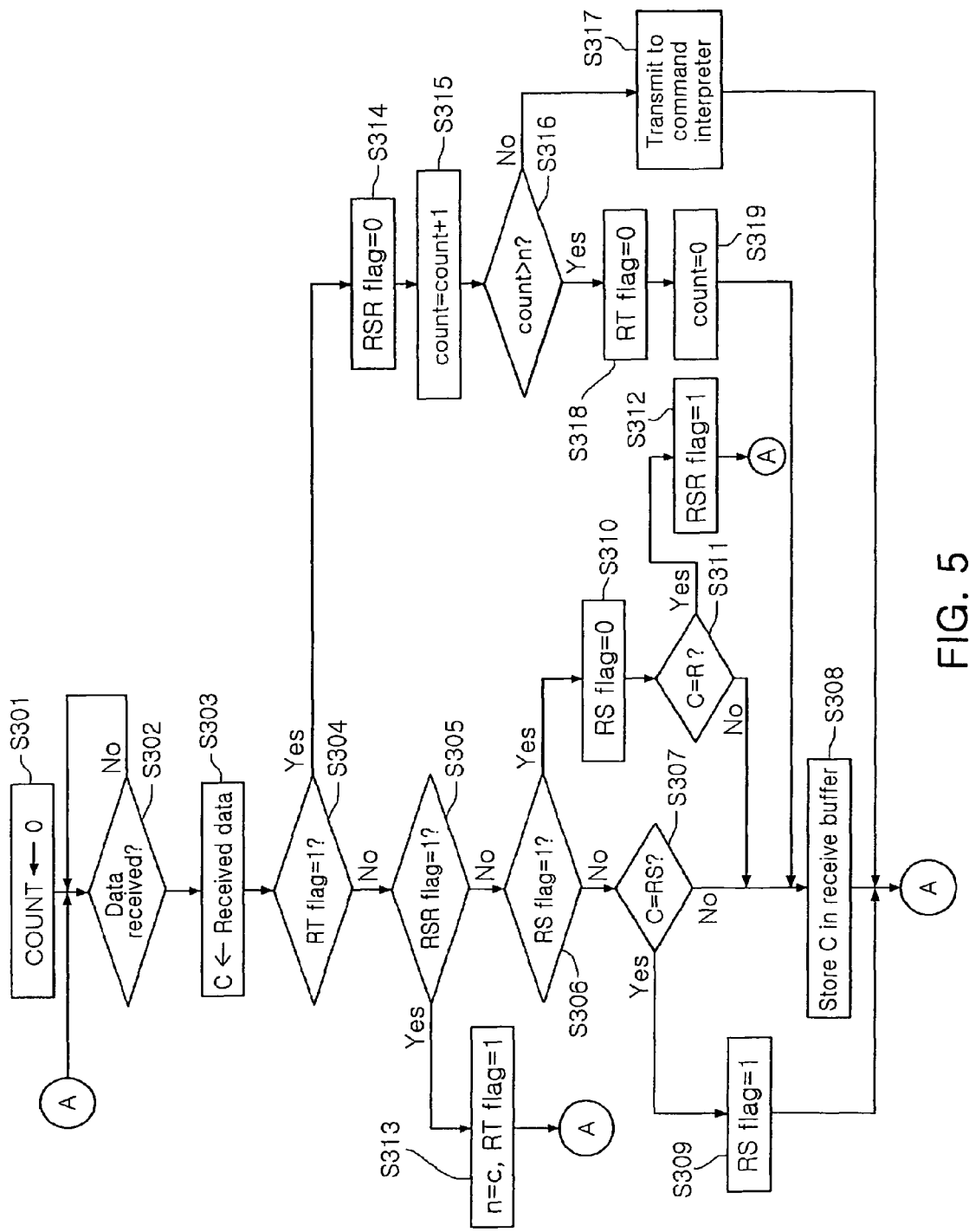
FIG. 5 is a flow chart illustrating a real-time command switching control process in a printing apparatus according to an embodiment of the present invention.
Figure 6:
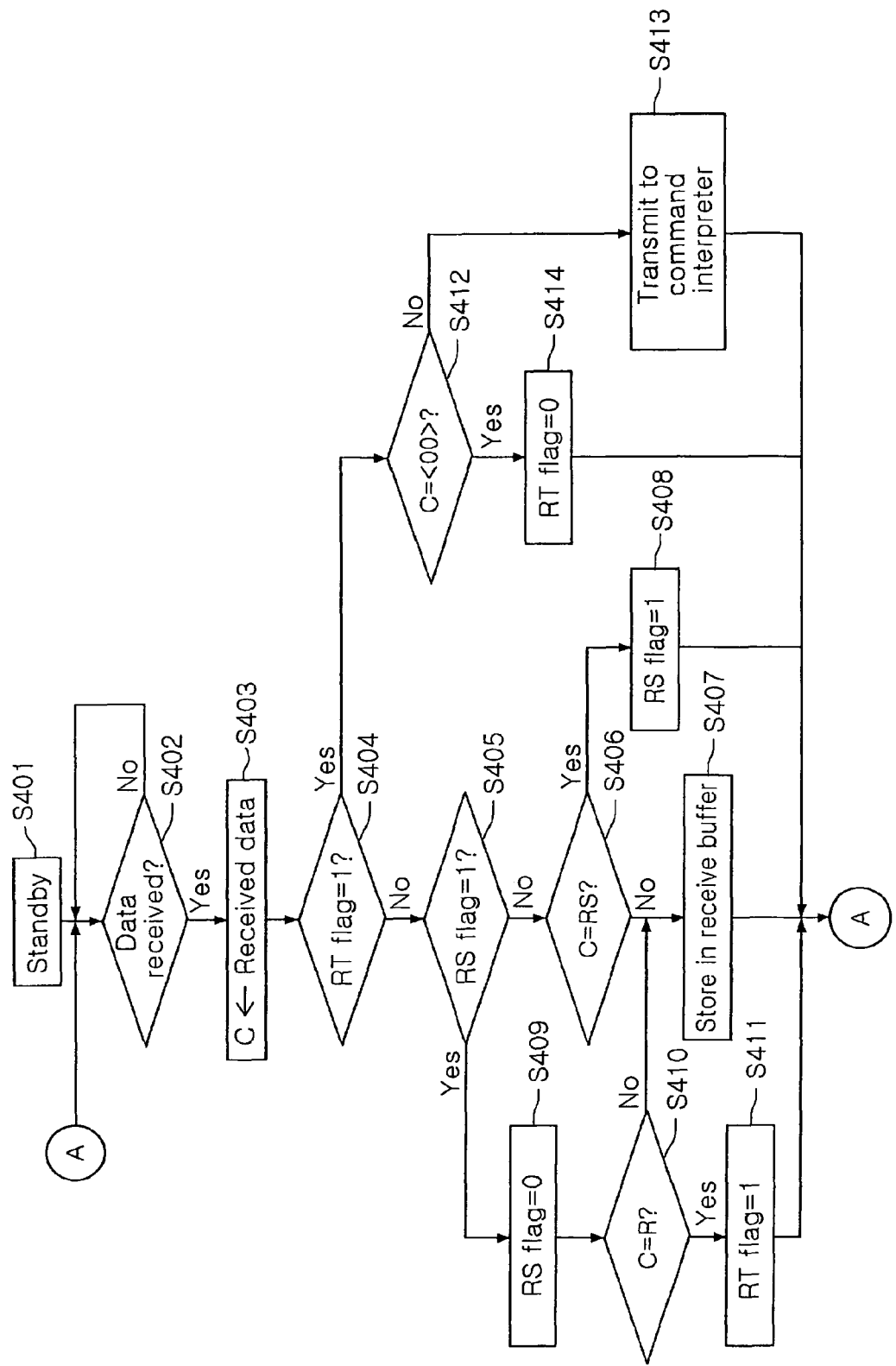
FIG. 6 is a flow chart illustrating a real-time command switching control process in a printing apparatus according to another embodiment of the present invention.

FIGS. 5 and 6 are flow charts illustrating control processes of the printing apparatus for embodiments of the present invention.

First, FIG. 5 illustrates an example in which the real-time command identifier is set to include an identification value for instructing the beginning of the real-time command, and a duration value of the data to be converted to a real-time command, with the real-time command identifier expressed as "[RS]R<n>." On the other hand, in FIG. 6, the real-time command identifier is set to include a value for instructing the beginning of the real-time command, and a value for instructing the ending of the real-time command, in which the real-time command identifier is expressed as "[RS]R . . . <00>."

With reference to FIG. 5, the real-time command switching means 33 sets the variable count for counting the duration of the data at 0, and sets the flags for real-time conversion, the RT flag, the RSR flag and the RS flag at 0 in S301.

Next, when the data receiving means 31 receives data in S302, the received data is set as parameter C, and the RT flag value is checked first whether or not it is 1 in S304. If [RS]R<n> is not received, the RT flag maintains 0. If the RT flag is 0, the RSR flag is checked next whether or not it is 1 in S305. If the entire [RS]R is not received from the real-time command identifier, the RSR flag maintains 0.

If it is determined that the RSR flag is also 0 in the above step, then the RS flag is checked next whether or not it is 1 in S306. The RS flag is converted to 1 when [RS] is received from the real-time command identifier, and if the RS flag is also determined to be 0, then the received data C is checked next whether or not it is RS in S307.

If it is determined that the received data C is not RS, the received data is a general command, which thus is stored in the receive buffer 34 in S308.

The general command without the real-time command identifier attached is stored in the receive buffer 34 according to the processes described herein.

On the other hand, when a real-time command identifier with corresponding data is received, first, [RS] is received at the data receiving means 31.

When [RS] is received, the process proceeds from step S303 to steps S306 and to S307, and as the received data C becomes RS in the step S307, the process moves on to S309 in which the status value of the RS flag is changed to 1.

Next, as R is received, the RS flag becomes 1 in S306, so the process moves on to S310 in which the RS flag is initialized at 0 to be ready to process the next data. Then, the received data C is checked whether or not it is R in S311, and if so, the status value of the RSR flag is changed to 1 in S312.

Next, when <n> is received, the RSR flag is 1, so the process moves on to S313 in which the parameter n value is set as the received data C and the status value of RT flag is changed to 1.

Thereafter, when the next data is received, the RT flag is 1 in S304, thus the process moves on to S314 in which the RSR flag is initialized at 0. Afterwards, each time the subsequent data is received, the parameter count is increased by 1, and the received data is transmitted to the command interpreter 35 until the parameter becomes n in the steps S315 to S317.

When the $n^{th}$ data is transmitted to the command interpreter 35 and the $n+1^{th}$ data is received, the count value becomes n+1, larger than n. Thus, the process moves from S316 to S318 and S319, the RT flag and the parameter count are initialized at 0 to be ready to process the next data, and the received data C is stored in the receive buffer 34.

Therefore, the data designated by the real-time command identifier [RS]R<n> is transmitted to the command interpreter 35, and then the command is interpreted and executed at real time. Other received data is stored in the receive buffer in the order received, and interpreted and executed one by one in the order of FIFO.

According to the processes described above, suppose that print data and command data is transmitted from the host computer 30 to the printing apparatus in a form of AAAAA [LF] BBBBB[LF] CCCCC[LF] DDDDD[LF] [RS] R<06>EEEEE[LF] FFFFF[LF] GGGGG[LF]. Here, A, B, C, D, E and F represent print data and [LF] represents command data. Among the received data, AAAAA[LF] BBBBB[LF] CCCCC[LF] DDDDD[LF] FFFFF[LF] GGGGG[LF] are stored in the receive buffer in their order, while EEEEE [LF] is transmitted to the command interpreter. Therefore, when there is much data waiting at the receive buffer 34, the printing result is as represented as follows.

EEEEE
AAAAA
BBBBB
CCCCC
DDDDD
FFFFF
GGGGG

FIG. 6 illustrates an alternative in which the real-time command identifier is set to include an identification value indicating the starting point of the real-time command and an identification value indicating the ending point of the real-time command. Suppose that the identification value indicating the starting point is [RS]R, and the identification value indicating the ending point is <00>. In the embodiment shown in FIG. 6, the real-time command switching means 33 of the printing apparatus has the RT flag and the RS flag set 0, waiting for data to be received in S401.

Then, when the data is received through the data receiving means 31 in S402, C is changed to the received data in S403, the RT flag or the RS flag are checked whether or not they are 1 in S404 and S405. When the real-time command identifier is not received, the RT flag and the RS flag remain 0.

If the value of neither the RT flag nor the RS flag is 1, the received data C is checked next whether or not it is RS in S406. If the received data is not RS, the received data C is stored in the receive buffer 34 in S407. Thus, the general print data or command data is received in the receive buffer one by one in S407.

On the other hand, when [RS] is received from the real-time command identifiers, C=RS in S406, and thus the RS flag is changed to 1, waiting for the next data in S408.

Next, when R is received from the real-time command identifiers, the RS flag is 1 in the step of S405, so the process moves on to steps S409 to S411 and the RS flag is initialized at 0 to be ready to-process the next data and the RT flag is designated 1 in S411.

For the data received afterwards, as the RT flag is 1 in S404, the steps S412 and S413 are conducted to transmit the data to the command interpreter 35 up to the point until the real-time command identifier <00> is received.

When <00> is received, the process moves from the step S412 to the step S414, and the RT flag is initialized at 0, and the data received afterwards are stored in the receive buffer 34 until another real-time command identifier [RS]R is received in the same fashion as described above.

According to the above processes, the data received between [RS]R and <00> is not stored in the receive buffer 34 but transmitted directly to the command interpreter 35 to be interpreted and processed prior to the data stored in the receive buffer 34.

For example, suppose that print data and command data such as AAAAA[LF] BBBBB[LF] CCCCC[LF] DDDDD [LF] [RS]REEEEE[LF] <00> FFFFF[LF] GGGGG[LF] are transmitted from the host computer 30 to the printing apparatus in their order. From the received data, AAAAA[LF] BBBBB[LF] CCCCC[LF] DDDDD[LF] FFFFF[LF] GGGGG[LF] are sequentially received in the receive buffer 34, and while EEEEE[LF] is transmitted to the command interpreter 35. Thus, when there is much data waiting at the receive buffer 34, the printing result can be represented as follows.

EEEEE
AAAAA
BBBBB
CCCCC
DDDDD
FFFFF
GGGGG

In the present invention as set forth above, a general command used in the printing apparatus is converted to a real-time command to be processed, without a need to distinguish between a real-time command from a general command. Thus, the invention allows various controls of the printing apparatus with fewer number of commands, and the user has to be familiar with less commands to conveniently use the printing apparatus. In addition, the mechanic functions of the printing apparatus such as paper cutting, paper transfer, carrier transfer, cash drawer opening and the like can be controlled at real time, easily expanding the functions of the printing apparatus.

While the present invention has been shown and described in connection with the preferred embodiments, it will be apparent to those skilled in the art that modifications and variations can be made without departing from the spirit and scope of the invention as defined by the appended claims.

What is claimed is:

1. A printing apparatus operated by command data and print data transmitted from the host computer comprising:
    a data receiving means for receiving data outputted from the host computer;
    a data transmission means for transmitting data to the host computer;
    a real-time command switching means for checking whether or not data received by the data receiving means is a real-time command identifier which converts a non real-time command into a real-time command when an error occurs and designates the order in which real-time commands are to be processed, and if the data is the real-time command identifier, outputting the received data designated by the identifier directly to a command interpreter, and if the data is not the real-time command identifier, outputting the data to a receive buffer;
    the receive buffer for storing the received data transmitted from the real-time command switching means and outputting the data in the order of First-In-First-Out (FIFO) to the command interpreter;
    the command interpreter for interpreting the received data outputted from the real-time command switching means with first priority, and reading and interpreting the received data stored in the receive buffer in the order of FIFO with next priority, distinguishing between command data and print data;
    a print buffer for storing the received data distinguished as print data by the command interpreter; and
    a control means for receiving the data distinguished as command data by the command interpreter to control the overall function of the printing apparatus according to the corresponding command and reading the data from the print buffer to be printed,
    wherein the real-time command identifier converts to a real-time command at least one non real-time command selected from the group consisting of: a command for opening a cash drawer, a paper cutting command, and a status information request command, and wherein the real-time command is processed in real time and is processed even if an error occurs, and the non real-time command is processed according to First-In-First-Out and is not processed if an error occurs.

2. The printing apparatus according to claim 1, wherein printing apparatus further comprises:
    a plurality of detectors for detecting status and error in the printing apparatus; and
    a status memory for storing status information of the printing apparatus detected by the plurality of detectors, and wherein, in case of receiving a status request command, the command interpreter reads status information of the status memory and transmits the status information to the data transmission means.

3. The printing apparatus according to claim 2, wherein the real-time command identifier comprises an identification value for indicating a beginning point of a real-time command and a data duration value of the real-time command.

4. The printing apparatus according to claim 2, wherein the real-time command identifier comprises an identification value for indicating a beginning point of a real-time command and an ending point of the real-time command.

5. The printing apparatus according to claim 1, wherein the real-time command identifier comprises an identification value for indicating a beginning point of a real-time command and a data duration value of the real-time command.

6. The printing apparatus according to claim 1, wherein the real-time command identifier comprises an identification value for indicating a beginning point of a real-time command and an ending point of the real-time command.

7. The printing apparatus processing real-time command according to claim 1, wherein the data indicated by the checked real-time command identifier comprises one or more data following the real-time command identifier.

8. A control method of a printing apparatus operated by transmission of command data and print data from the host computer, comprising steps of:
    (i) receiving data from the host computer;
    (ii) checking whether or not the received data is a real-time command identifier which converts a non real-time command into a real-time command when an error occurs and designates data order in which a real-time command is conducted;
    (iii) interpreting the real-time command identifier when the real-time command identifier is received, to extract the data order designated by the real-time command identifier;
    (iv) storing the received data in a receive buffer when it is determined from the previous step that the received data is not the real-time command identifier;
    (v) interpreting the data extracted in the step (iii), and then interpreting the data stored in the receive buffer in the order of FIFO; and
    (vi) executing the operation of the printing apparatus according to the interpreting result in the step (v),
    wherein the real-time command identifier converts to a real-time command at least one non real-time command selected from the group consisting of: a command for opening a cash drawer, a paper cutting command, and a status information request command, and wherein the real-time command is processed in real time and is processed even if an error occurs, and the non real-time command is processed according to First-In-First-Out and is not processed if an error occurs.

9. The method according to claim 8, wherein the step (iii) comprises:
    checking a beginning point and duration information of the data from the real-time command identifier;
    counting data received subsequently after the real-time command identifier; and
    recognizing the data received up to the point until the counting value coincides with the checked duration of the data as real-time command data and extracting the real-time command data.

10. The method according to claim 8, wherein the step (iii) comprises:
    checking whether or not the received data is an identifier indicating a beginning point of a real-time command;
    checking whether or not the received data is an identifier indicating an ending point of a real-time command; and
    recognizing the data received between the identifier indicating the beginning point of the real-time command and the identifier indicating the ending point of the real-time command as real-time command.

11. A data processing apparatus comprising:

a host computer for checking whether or not there is a need for real-time processing when print data or command data is produced, and if there is a need for real-time processing, generating a real-time command identifier to convert a non real-time command into a real-time command and designate data to be processed at real time and transmitting the real-time command identifier with corresponding data to a printing apparatus; and the printing apparatus for checking whether or not the data is the real-time command identifier when data is received from the host computer, and if the data is the real-time command identifier, interpreting the real-time command identifier to extract the designated data and process at first priority, and if the data is not the real-time command identifier, processing the data in the order to FIFO at next priority, wherein the real-time command identifier converts to a real-time command at least one non real-time command selected from the group consisting of: a command for opening a cash drawer, a paper cutting command, and a status information request command, and wherein the real-time command is processed in real time and is processed even if an error occurs, and the non real-time command is processed according to First-In-First-Out and is not processed if an error occurs, wherein the printing apparatus comprises:

a data receiving means for receiving data outputted from the host computer;

a data transmission means for transmitting data to the host computer;

a real-time command switching means for checking whether or not the data received by the data receiving means is a real-time command identifier which designates the order in which the real-time commands are to be processed, and if the data is the real-time command identifier, outputting the received data designated by the identifier directly to a command interpreter, and if the data is not the real-time command identifier, outputting the data to a receive buffer;

the receive buffer for storing the data other than the data passed through the real-time command switching means and outputting the data in the order of FIFO;

a command interpreter for interpreting the data outputted from the real-time command switching means with first priority, and interpreting the received data outputted from the receive buffer with next priority, distinguishing between command data and print data;

a print buffer for storing the data distinguished as print data by the command interpreter; and a control means for receiving the data distinguished as command data by the command interpreter to control the overall function of the printing apparatus, and reading the data from the print buffer to be printed.

12. The printing apparatus according to claim 11, wherein the real-time command identifier comprises a first identification value for indicating a beginning point of a real-time command and a data duration value indicating a duration of corresponding data.

13. The data processing apparatus according to claim 11, wherein the real-time command identifier comprises a first identification value positioned at the front of the data to be processed at real time, indicating a beginning point of a real-time command, and a second identification value positioned at the end of the data to be processed at real time, indicating an ending point of the real-time command.

14. The data processing apparatus according to claim 11, wherein the printing apparatus further comprises:

a plurality of detectors for detecting status and error in the printing apparatus; and a status memory for storing status information of the printing apparatus detected by the plurality of detectors, and wherein, in case of receiving a status request command, the command interpreter reads the status information from the status memory and transmits the status information to the data transmission means.

* * * * *

UNITED STATES PATENT AND TRADEMARK OFFICE
CERTIFICATE OF CORRECTION

| | | |
|---|---|---|
| PATENT NO. | : 8,130,393 B2 | Page 1 of 1 |
| APPLICATION NO. | : 11/408733 | |
| DATED | : March 6, 2012 | |
| INVENTOR(S) | : Young Kyoo Cho et al. | |

It is certified that error appears in the above-identified patent and that said Letters Patent is hereby corrected as shown below:

Column 14, Line 17, Claim 12, delete "printing" and insert -- data processing --

Signed and Sealed this
Nineteenth Day of June, 2012

David J. Kappos
*Director of the United States Patent and Trademark Office*